Nov. 25, 1952
J. L. BINKLEY
2,619,259
SEED PLANTER
Filed Jan. 20, 1950
2 SHEETS—SHEET 1
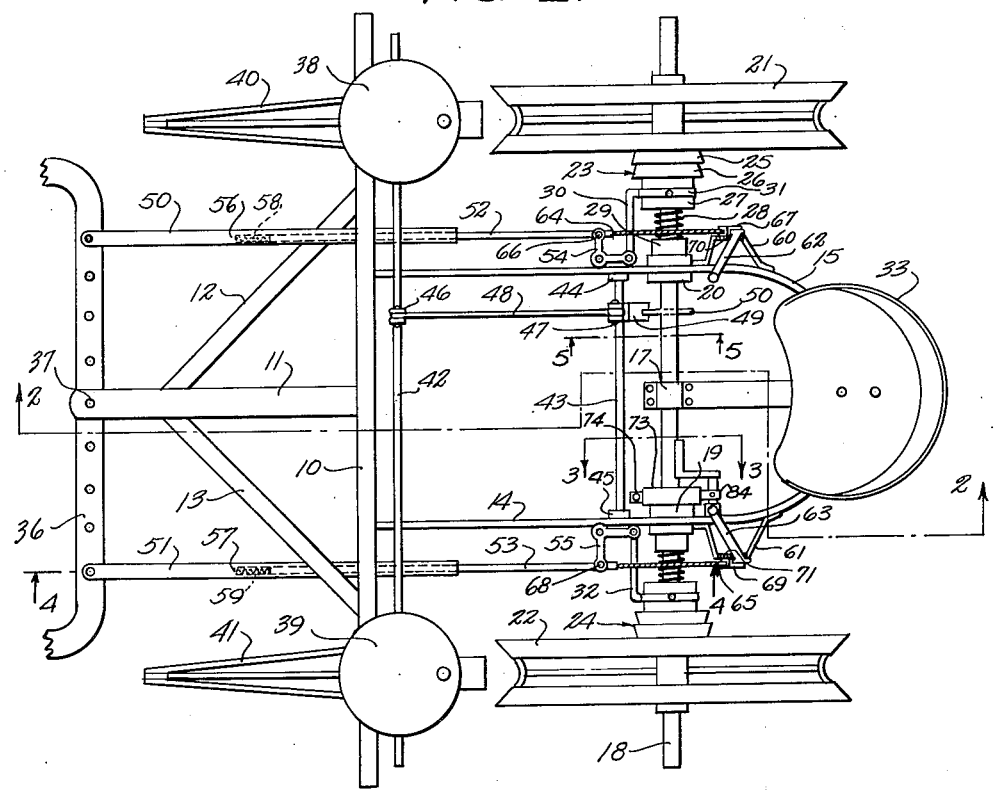
INVENTOR
JAMES L. BINKLEY,
BY McMorrow, Berman & Davidson
ATTORNEYS

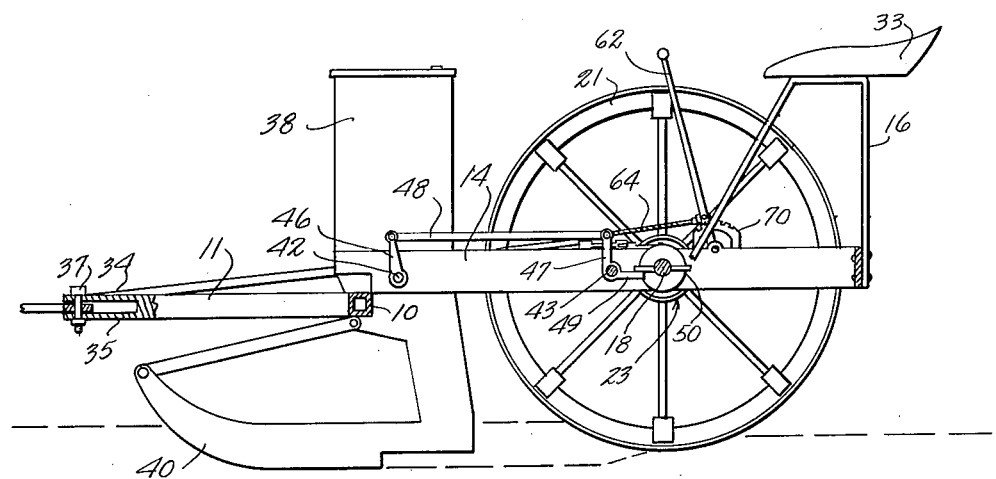
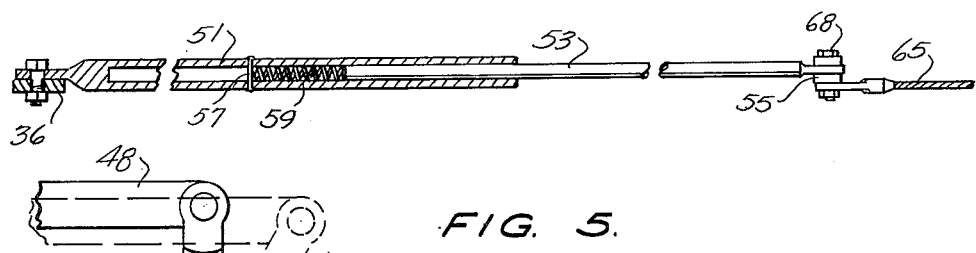
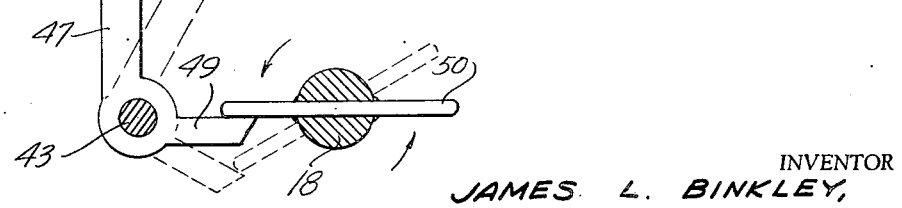

Patented Nov. 25, 1952

2,619,259

UNITED STATES PATENT OFFICE 2,619,259

SEED PLANTER

James L. Binkley, Bellefontaine, Ohio

Application January 20, 1950, Serial No. 139,626

2 Claims. (Cl. 222—129)

This invention relates to seed planters, and more particularly to a planter for planting seed, such as corn or cotton seed, at uniformly spaced-apart intervals along substantially parallel rows to provide a planting pattern commonly referred to as a check row pattern, wherein cultivators can be operated in different directions, the present invention being a continuation-in-part of my application Serial No. 754,381 filed June 13, 1947, for "Corn Planter," now Patent No. 2,528,996.

It is among the objects of the present invention to provide an improved seed planter which will drop seed at uniformly spaced-apart intervals along substantially parallel rows, is manually controlled for starting and stopping the seed-dropping mechanism to align the seed drop intervals or seed hills transversely of a large number of rows, and is automatically controlled upon short turning to release the drive from the inside ground wheel so that the spacing of the seed hills is controlled only by the outside wheel and kept in phase with the spacing along the rows, which includes locking means for the seed dropping mechanism so that the planter can be removed from a partly planted field and later returned to the field and placed in operation at the proper starting point without losing the turning or phasing position of the seed-dropping mechanism thereof, and which is simple and durable in construction, easy to use, and highly effective in maintaining the desired planting pattern regardless of curvature of the rows, turns at the ends of the rows, and even in the event the planter is removed from and returned to the planting area before the planting is completed.

Other objects and advantages will become apparent from a consideration of the following description and the appended claims in conjunction with the accompanying drawings, wherein:

Figure 1 is a top plan view of a seed planter illustrative of the invention;

Figure 2 is a longitudinal cross-section on the line 2—2 of Figure 1;

Figure 3 is a cross-section on an enlarged scale of a fragmentary portion of the machine taken on the line 3—3 of Figure 1;

Figure 4 is a longitudinal cross-section on an enlarged scale on the line 4—4 of Figure 1; and Figure 5 is a cross-section on an enlarged scale on the line 5—5 of Figure 1.

With continued reference to the drawings, the corn planter comprises a frame including a front cross-bar 10 of hollow, rectangular cross-section, a tongue 11 projecting perpendicularly from the cross-bar 10 at the mid-length location of the latter in a forward direction, diagonal braces 12 and 13 connected between the tongue and the cross-bar at respectively-opposite sides of the tongue for rigidly supporting the tongue in substantially perpendicular relationship to the cross-bar, and a U-shaped member 14 connected at its open end to the cross-bar 10 substantially symmetrical with the mid-length location of the cross-bar and having legs extending rearwardly from the cross-bar substantially perpendicular thereto, and an arcuately-curved closed end portion or bight 15.

A U-shaped seat bracket 16 is disposed in inverted position with the end of one of its legs attached to the arcuately-curved end 15 of the frame member 14 substantially at the mid-length location of this frame member end portion, and its other leg connected to a bearing box 17.

An axle shaft 18 extends below the frame member 14 transversely of this frame member and substantially parallel to the front cross-bar 10. This axle is symmetrically located relative to the longitudinal center line of the frame member 14, and bearing blocks 19 and 20 secured to the opposite legs of the U-shaped frame member 14 receive the axle 18 for rotation therein. Ground wheels 21 and 22 are journaled on the axle 18 at respectively-opposite sides of the frame member 14, and clutch assemblies, generally indicated at 23 and 24, are operatively connected between the wheels 21 and 22, respectively, and the axle 18. Each of the clutches, as is particularly indicated as in the case of the clutch assembly 23, comprises a hollow, conical clutch element 25 secured to the wheel, a clutch element splined or keyed to the axle 18 and including a conical portion 26 frictionally engageable in the portion 25, and a grooved, cylindrical portion 27, a spring 28 positioned between the cylindrical portion 27 and a thrust bearing 29 surrounding the axle in contact with the adjacent bearing box 20 to resiliently urge the portion 26 into the portion 25 for frictional engagement therein. The clutch component comprising the parts 26 and 27 is keyed or splined onto the axle 18, so that it rotates with the axle, but is movable longitudinally thereof, and an L-shaped lever 30 has, at one end, a fork partly surrounding the cylindrical clutch portion 27 and provided with pins 31 engaged in the annular groove in this portion to move the conical portion 26 out of frictional engagement with the clutch portion 25 against the force of spring 28. A similar L-shaped lever 32 is similarly connected to the grooved, cylindrical portion of the clutch assembly 24.

While cone clutch assemblies have been illustrated and hereinabove described, it is to be understood that other types of clutches may be substituted for such cone clutches without in any way exceeding the scope of the invention.

The axle 18 passes through and supports the bearing 17 to which one end of the seat bracket 16 is secured, and a seat 33 is secured on the upper end of this bracket and positioned rearwardly of the axle 18.

The tongue 11 has a recess opening to its front end and providing at the front end of the tongue a bifurcated portion including upper and lower legs or furcations 34 and 35. A tow bar 36 is disposed between the legs 34 and 35 and is pivotally connected, substantially at its mid-length location, to the tongue 11 at the front end of the latter by a pivot pin or bolt 37 extending through registering apertures in the two legs 34 and 35 of the bifurcated portion of the tongue and in the tow bar 36.

Two seed hoppers 38 and 39 are mounted on the frame cross-bar 10 at respectively-opposite sides of the tongue 11, and seed-depositing runners 40 and 41 are secured to the frame cross-bar respectively below the hoppers 38 and 39 to receive seed from these hoppers and convey the seed into furrows provided in the ground by the runners. Seed-dispensing means, not illustrated, is provided in each hopper and driven by a common shaft 42 which extends through the bottom portions of the hoppers and is adjacent and substantially parallel to the cross-bar 10. A shaft 43 is journaled at its ends in bearings 44 and 45 carried by the legs of the U-shaped frame member 14 rearwardly of the cross-bar 10 and in position such that the shaft 43 is substantially parallel to the shaft 42. An arm 46 projects upwardly from the shaft 42, and a complementary arm 47 projects upwardly from the shaft 43. The arms 46 and 47 are pivotally inter-connected at their upper ends by a link 48, and a tongue 49 extends downwardly and rearwardly from the shaft 43 at the location of the arm 47. A pin 50 extends through the axle 18 in alignment with the tongue 49 and projects to opposite sides of the axle a distance such that the ends of this pin will contact the tongue 49 and move this tongue in a downward and forward direction two times during each complete revolution of the axle 18. This movement of the tongue 49 rocks the shaft 43 which, through the intermediacy of the arms 47 and 46 and the link 48, rocks the shaft 42 and actuates the seed-dropping mechanism twice during each rotation of the machine axle. The circumference of the wheels 21 and 22 is such that, by operating the seed-dropping mechanism twice for each complete revolution of the wheels, the seed drops or hills are spaced at the desired intervals. Obviously, the circumference of the wheels may be varied, and the number of times the tongue is moved for each complete revolution of the axle changed to provide different intervals between the hills, as may be desired.

Means are provided for releasing the inner wheel clutch during short turning operation of the planter, so that the seed-dropping mechanism will be operated by the outer wheel alone, and the spacing of the hills or seed droppings will be maintained substantially constant.

This means comprises two elongated, tubular members 50 and 51 each pivotally connected at one end to the drawbar 36 near a respective end of the latter and extending rearwardly from the drawbar in spaced-apart, substantially parallel relationship past the frame cross-bar 10 of the planter, elongated rods 52 and 53 slidably received in the members 50 and 51, respectively, and protruding from the rear ends of these members, and two bell cranks 54 and 55 pivotally mounted on the U-shaped portion 14 of the frame at respectively-opposite sides of the latter. The bell crank 54 has one leg pivotally connected to the rearward end of the rod 52 and its other leg pivotally connected to the inwardly-disposed end of the L-shaped, clutch-operating lever 30, while the bell crank 55 has one leg pivotally connected to the rearward end of the rod 53 and its other leg pivotally connected to the inwardly-disposed end of the L-shaped clutch-operating lever 32. Suitable spring abutments 56 and 57 are disposed in the tubular members 50 and 51 intermediate the length of the latter, and coiled compression springs 58 and 59 are respectively disposed in the members 50 and 51 between the abutments 56 and 57 and the adjacent or inner ends of the rods 52 and 53.

With this arrangement, when the tow bar 36 is swung about its pivotal connection 37 with the front end of the tongue 11, the clutch-releasing mechanism, at the side of the planter disposed at the inner side of the turn, will be actuated to move the corresponding L-shaped lever 30 or 32 in a direction to release the corresponding clutch. The telescopic connection between the tubular members and the rods provides a lost-motion connection for the clutch-releasing mechanism at the side of the vehicle disposed at the outer side of the turn, so that the clutch at this side of the vehicle is not affected by swinging of the tow bar incident to a sharp turn of the planter and the towing tractor. The springs 58 and 59 are somewhat stiffer than the clutch-engaging springs, such as the spring 29, so that the clutch-engaging springs will be compressed by the clutch-disengaging operation of the clutch-releasing devices before the springs 58 and 59 are fully compressed.

Means are provided for manually locking the clutches 23 and 24 in disengaged condition, and this means comprises two substantially U-shaped brackets 60 and 61 mounted on the outer side of the U-shaped frame portion 14 at respectively-opposite sides of and near the rear end of this frame portion to project laterally outwardly from the latter, hand levers 62 and 63 pivotally mounted at their lower ends on the brackets 60 and 61, respectively, and flexible strands or cables 64 and 65 connecting the rods 52 and 53 to the hand levers 62 and 63, respectively, at locations spaced from the pivotal connections between these hand levers and the brackets 60 and 61.

The cable 64 is pivotally connected at its forward end to the pivot pin 66 which pivotally connects the rear end of the rod 52 to the bell crank 54, and is connected at its rearward end to the hand lever 62 by a suitable clip 67. The cable 65 is pivotally connected at its forward end to the pivot pin 68 which pivotally connects the rear end of the rod 53 to the bell crank 55 and is pivotally connected at its rearward end to the hand lever 63 by a clip 69. Toothed quadrants 70 and 71 are provided on the brackets 60 and 61, respectively, and the hand levers 62 and 63 are provided with manually-movable detents which engage with the teeth or notches of these quadrants to releasably hold the hand levers in adjusted position. When either of the hand levers is pulled rearwardly to its limiting position, and releasably locked in such position, the adjacent clutch will be held in disengaged condition. When both levers are pulled rearwardly and locked, both of the clutches will be maintained out of engagement and the planter can be moved without operating the seed-dropping mechanism.

In order to maintain the seed-dropping mechanism against accidental movement while the clutches are released, so that the mechanism will be in exactly the same operative position, when planting is resumed, as it was when planting was discontinued, a suitable manually-actuated brake is provided on the axle 18, as particularly illustrated in Figure 3.

This brake comprises a pulley or drum 72 secured on the axle 18 adjacent one of the bearing blocks 19 and 20 in which the axle is journaled, the pulley being illustrated as mounted on the axle adjacent the bearing block 19. A flexible brake band 73 surrounds the drum 72 and is provided at one side with a loop 74 which is anchored to the adjacent leg of the frame portion 14 by an anchor pin 75. The two ends of the brake band 73 are bent outwardly to a condition in which they are spaced apart and substantially parallel to each other and are apertured to provide a pair of apertured ears 76 and 77. A bracket 78 is secured on the frame portion 14 adjacent the ears 76 and 77, and a brake shaft 79 is journaled at one end in this bracket to project outwardly therefrom above the upper ear 77 of the brake band. A headed pin 80 extends through the ears 76 and 77 and is provided, near its upper end, with a longitudinally-extending slot 81 which receives the shaft 79. A compression spring 82 surrounds the pin 80 between the ears 76 and 77 to resiliently urge these ears apart and free the brake band from the brake drum 72, and an elliptical cam 83 is secured on the shaft 79 and operatively disposed between the upper ear 77 and an outwardly-extending abutment 84 on the upper end of the pin 80.

With this arrangement, when the shaft 79 is rotated to turn the cam, the brake band ears 76 and 77 will be forced together against the resistance of spring 82, and the band will be clamped about the brake drum 72 to hold the axle 18 and the seed-dropping mechanism of the planter against movement.

A hand lever 84 is secured at its lower end to the shaft 81, and locking means for this lever, such as a suitable quadrant supported on the frame portion 14 and a manually-movable detent carried by the lever are provided to releasably hold the lever in brake-engaging position.

During normal operation of the planter, the seed will be dropped at uniformly spaced-apart intervals as the planter progresses along the rows. When the planter is turned at the ends of the rows, this uniform spacing of the seed hills will be maintained, since during this operation the seed-dropping mechanism is driven only by the wheel at the outer side of the turn, and if the turns are maintained uniform, when each turn is completed and the planter is started back along a new pair of rows, the spacing of the seed hills will be the same as in the previous rows and will be aligned transversely of the rows.

When it is desired to take the planter away from the planting area before the planting is completed, the planter is brought to the end of a pair of rows and is turned and started back down the next pair of rows and is then stopped. Both clutches 23 and 24 are manually released and the brake is set to hold the seed-dropping mechanism against accidental movement. A stake is then driven into the ground at one end of the axle 18 and the planter is then removed from the area. When the planter is returned to the area and planting is resumed, it is necessary only to place the planter in the last started rows, bring the axle into alignment with the stake, release the brake and engage the clutches 23 and 24 whereupon the planter will resume planting with the same spacing and transverse alignment of the seed hills as prevailed at the time the planting was discontinued.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a seed planter having a frame, an axle journaled on said frame and extending transversely thereof, wheels journaled on said axle one at each end of the latter, friction clutches drivingly connected one between each wheel and said axle, levers pivotally mounted on said frame and connected one to each of said clutches, seed dropping means carried on said frame and driven by said wheels through said clutches and said axle, a towing vehicle draw bar extending transversely of said frame at the front end of the latter, and means pivotally connecting said frame to said drawbar intermediate the ends of the latter, clutch operating means comprising elongated members extending one between each of said clutch operating levers and said drawbar and connected each at one end to the corresponding lever and at its other end to said drawbar near the corresponding end of the latter, said clutch operating means being effective to disengage the clutch connected to the wheel at the inner side of a turn made by said planter and thereby limit the driving of said seed dropping means to the wheel at the outside of a turn when said planter is being turned.

2. In combination with a seed planter having a frame, an axle journaled on said frame and extending transversely thereof, wheels journaled on said axle one at each end of the latter, friction clutches drivingly connected one between each wheel and said axle, levers pivotally mounted on said frame and connected one to each of said clutches, seed dropping means carried on said frame and driven by said wheels through said clutches and said axle, a towing vehicle drawbar extending transversely of said frame at the front end of the latter, and means pivotally connecting said frame to said drawbar intermediate the ends of the latter, clutch operating means comprising elongated members extending one between each of said clutch operating means and said drawbar and connected each at one end to the corresponding lever and at its other end to said drawbar near the corresponding end of the latter, said clutch operating means each comprising a tubular member having one end closed, a rod slidably received in said tubular member and projecting from the other end of the latter, and a compression spring in said tubular member between the closed end of said tubular member and the end of said rod disposed inwardly of the tubular member and being effective to disengage the clutch connected to the wheel at the inner side of a turn made by said planter and thereby limit the driving of said seed dropping means to the wheel at the outside of a turn when said planter is being turned.

JAMES L. BINKLEY.

REFERENCES CITED

The following references are of record in the file of this patent:

UNITED STATES PATENTS

| Number | Name | Date |
| --- | --- | --- |
| 374,759 | Riley | Dec. 13, 1887 |
| 593,647 | Gist | Nov. 16, 1897 |
| 759,559 | Scott | May 10, 1904 |
| 943,713 | Stayman | Dec. 21, 1909 |
| 1,294,244 | Doe | Feb. 11, 1919 |
| 1,568,417 | Rhenbottom | Jan. 5, 1926 |
| 1,770,095 | Wilson | July 8, 1930 |
| 2,296,209 | Kriegbaum et al. | Sept. 15, 1942 |
| 2,338,934 | Gross | Jan. 11, 1944 |
| 2,410,241 | Schramm | Oct. 29, 1946 |
| 2,449,841 | Phillips | Oct. 28, 1947 |
| 2,528,996 | Binkley | Nov. 7, 1950 |